United States Patent Office.

MARTIN NAHNSEN, OF SCHOENEBECK-ON-THE-ELBE, PRUSSIA, GERMANY.

PROCESS OF PRECIPITATING NITROGENOUS COMPOUNDS FROM IMPURE WATERS.

SPECIFICATION forming part of Letters Patent No. 402,848, dated May 7, 1889.

Application filed March 18, 1886. Renewed March 1, 1889. Serial No. 301,728. (No specimens.) Patented in Germany May 24, 1884, No. 31,864; in England October 14, 1884, No. 13,588; in Belgium March 2, 1885, No. 68,046; in France August 3, 1885, No. 157,840, and in Austria-Hungary August 8, 1885, No. 18,826, and No. 41,572.

*To all whom it may concern:*

Be it known that I, MARTIN NAHNSEN, a subject of the King of Prussia, German Emperor, residing at the city of Schoenebeck-on-the Elbe, in the Kingdom of Prussia, German Empire, have invented a certain new and useful Improved Process for Purifying Drainage-Waters and Sewage, (for which I have received Letters Patent in Germany, No. 31,864, dated May 24, 1884; in Austria, No. 18,826, dated August 8, 1885; in Hungary, No. 41,572, dated August 8, 1885; in England, No. 13,588, dated October 14, 1884; in France, No. 157,840, dated August 3, 1885; in Belgium, No. 68,046, dated March 2, 1885;) and I do hereby declare that the following is a full, clear, and exact description of the invention, which will enable others skilled in the art to which it appertains to make and use the same.

This invention has reference to a process for the purification of water; and it consists in mixing soluble salts of aluminium, hydrate of silicic acid, and lime with impure water.

In carrying out the invention I mix the soluble salts of aluminium, hydrate of silicic acid, which is produced from silicic compounds by treatment with acid, and lime together, and add this mixture to the water to be purified.

The method of performing the process consists in adding to the impure water—for instance, drainage-water or deleterious potable water—a dissolved soluble salt of aluminium, hydrate of silicic acid, which is produced from silicic compounds by treatment with acid, and lime, this latter only up to slight alkaline reaction. Upon the addition of the said ingredients the water at once becomes clear with the formation of a large flaky quickly-settling precipitate, which contains the whole of the phosphoric acid and a large portion of the non-nitrogenous and nitrogenous organic substances.

I am well aware that quicklime by itself or in combination with other chemicals has been employed for purifying water; but it possesses the unfavorable property of dissolving not inconsiderably in water, which is thereby rendered less suitable or totally unsuitable for many manufacturing and domestic purposes.

Drainage-waters may be generally regarded as solutions moderately rich in chlorides and sulphates of the alkalies, including earth alkalies, with preponderating contents of non-nitrogenous and nitrogenous organic substances. The latter, being in a state of continuous transformation, allow of the formation of ammoniacal salts or volatile nitrogen bases.

The problem of freeing water of this nature from its impurities, in order on the one hand to obtain a thoroughly-purified wholesome water and on the other hand to obtain in a compact form the commercially valuable components of the same, can only be satisfactorily solved by quickly precipitating the mechanical impurities and by quickly converting changeable and unchangeable substances into a compact precipitate. The most difficult part of this process is the selection of the materials suitable for precipitating the organic substances. For the solution of this problem, I employ soluble salts of aluminium in combination with hydrate of silicic acid and lime. Hydrate of silicic acid combines with lime alone, so as to form insoluble silicate of calcium—a dense and compact precipitate. This physical property of the silicate of calcium thus formed, and its great specific gravity as compared with the organic eliminations created in the most differing of waters by the addition of chemicals thereto, acts so that those specifically very light matters which frequently do not settle at all, but float on the surface of the water, sink quickly to the bottom. By the addition of hydrate of silicic acid and lime in conjunction simultaneously with soluble salts of aluminium the nearly complete separation from drainage-waters of organic—that is to say, nitrogenous readily putrefying and fermenting—bodies is effected. On the one hand is produced ammoniacal silicate of alumina, which precipitate, in analogy with the hydrate of alumina, at the same time possesses the property of precipitating on itself organic matters, coloring-stuffs, &c., as in the formation of dyes. On the other hand is produced silicate of calcium, which weighs down on the ammoniacal silicate of alumina and brings about a more speedy clarification of the water and settlement of the precipitate.

Soluble salts of aluminium alone cannot lead to the formation of ammoniacal silicate of alumina. Natural silicic acid (sand) is also not capable of creating a silicate of alumina in watery solution. Just as little can silicic alkalies be employed for this process, but solely soluble salts of aluminium in combination with hydrate of silicic acid and lime.

What I claim as my invention, and desire to secure by Letters Patent, is—

The process of precipitating nitrogenous compounds in solution from the drainage-waters of towns, waste waters of manufactures, and deleterious potable water, by mixing with the said impure water lime, soluble salts of aluminium, and hydrate of silicic acid, substantially as described.

In testimony whereof I have signed this specification in the presence of two subscribing witnesses.

MARTIN NAHNSEN.

Witnesses:
PH. HERTLING,
B. ROI.